United States Patent
Tung et al.

[11] Patent Number: 6,059,588
[45] Date of Patent: May 9, 2000

[54] EJECTOR MECHANISM FOR A CARD CONNECTOR

[75] Inventors: Shun-Chi Tung, Tu-Chen; Hung-Chi Yu, Taipei Hsien, both of Taiwan

[73] Assignee: Hon Hai Precision Ind. Co., Ltd., Taipei Hsien, Taiwan

[21] Appl. No.: 09/176,057

[22] Filed: Oct. 20, 1998

[30] Foreign Application Priority Data

Oct. 20, 1997 [TW] Taiwan .................................. 86217824

[51] Int. Cl.⁷ .................................................. H01R 13/62
[52] U.S. Cl. ............................................................ 439/159
[58] Field of Search .................................... 439/159, 152, 439/160; 361/754

[56] References Cited

U.S. PATENT DOCUMENTS

| | | | |
|---|---|---|---|
| 5,145,389 | 9/1992 | Okubo | 439/159 |
| 5,149,276 | 9/1992 | Dixon | 439/159 |
| 5,383,789 | 1/1995 | Watanabe | 439/159 |
| 5,421,737 | 6/1995 | Chen et al. | 439/157 |
| 5,451,168 | 9/1995 | Shuey | 439/159 |
| 5,456,610 | 10/1995 | Banakis et al. | 439/157 |
| 5,507,658 | 4/1996 | Ho | 439/159 |
| 5,533,906 | 7/1996 | Abe | 439/159 |
| 5,536,180 | 7/1996 | Ishida et al. | 439/159 |
| 5,667,396 | 9/1997 | Pan et al. | 439/160 |
| 5,683,258 | 11/1997 | Takano et al. | 439/159 |
| 5,713,750 | 2/1998 | Ho | 439/159 |
| 5,730,610 | 3/1998 | Hsia | 439/160 |
| 5,836,775 | 11/1998 | Hiyama et al. | 439/159 |
| 5,863,212 | 1/1999 | Duesteerhoeft | 439/160 |
| 5,899,763 | 5/1999 | Kajiura | 439/159 |

*Primary Examiner*—Steven L. Stephan
*Assistant Examiner*—Chandrika Prasad

[57] ABSTRACT

A card connector for engaging an inserted electrical card comprises a dielectric terminal housing, a metal card housing defining first and second shaft holes therein, and an ejector mechanism. The ejector mechanism consists of a push rod, an actuator having first and second pivots formed thereon, an ejection plate, and a spring. When a card is inserted into the card connector, the first pivot abuts against a first edge of the first shaft hole and the second pivot abuts against a first edge of the second shaft hole. To eject the card, a force is exerted on an exerting projection of the push rod. The actuator pivots about the first pivot, the second pivot abuts against a second edge of the second shaft hole, and the card is pushed outward. This action constitutes the first ejection stage which disengages the card from contacts of the card connector. As the exerting projection of the push rod is pushed further, the actuator pivots about the second pivot and the first pivot abuts against a second edge of the first shaft hole. This action constitutes the second ejection stage which pushes the card out of the card connector.

14 Claims, 10 Drawing Sheets

EJECTOR MECHANISM FOR A CARD CONNECTOR

BACKGROUND OF THE INVENTION

1. Field of the Invention

The present invention relates to a card connector ejector mechanism, and particularly to a card connector ejector mechanism which is easy to assemble and which provides a stable operation thereby preventing disconnection between components thereof.

2. The Prior Art

Portable or laptop computers are provided with card connectors for receiving an IC card which expands the memory thereof. Each card connector is equipped with an ejector mechanism for ejecting an inserted IC card. The ejector mechanism commonly includes a push bar, an actuator, and an ejection plate whereby when the push bar is activated by a user, the inserted card will be ejected.

The configuration of the ejector mechanism depends on the type of card used with the connector. Taiwan Patent Application No. 83107162 and U.S. Pat. No. 5,456,610 each disclose an ejector mechanism having a cutout defined in a push bar for engaging with a tab of an ejection plate. U.S. Pat. No. 5,421,737 discloses a card ejector mechanism having a pivotal connection between a push rod and a tab of an ejection plate. Taiwan Patent Application No. 83107162 and U.S. Pat. Nos. 5,149,276 and 5,451,168 disclose ejector mechanisms including a third member which links a push rod to an ejection plate. In another embodiment of U.S. Pat. No. 5,451,168 the third member has a retaining portion for connecting with the connector.

The above disclosed ejector mechanisms comprise many components which complicates assembly and results in increased manufacturing costs. In addition, the connection between the push rod and the tab of the ejection plate may become disengaged during actuation of the ejector mechanism. Furthermore, the assembly of the third member between the push rod and ejection plate is difficult and unstable.

Hence, an improved card connector ejector mechanism is requisite to eliminate the above mentioned defects of current card connector ejector mechanisms.

SUMMARY OF THE INVENTION

Accordingly, an objective of the present invention is to provide an easily assembled ejector mechanism for a card connector of a computer.

Another objective of the present invention is to provide an ejector mechanism for a card connector having a stable arrangement which prevents disengagement between components thereof.

A further objective of the present invention is to provide an ejector mechanism for a card connector having a connecting member provided between a push rod and an ejection plate.

Yet another objective of the present invention is to provide an ejector mechanism for a card connector wherein ejection of the card takes place in two stages and is facilitated by two guiding means.

To fulfill the above mentioned objectives, according to a preferred embodiment of the present invention, a card connector for engaging an inserted electrical card comprises a dielectric terminal housing, a metal card housing defining first and second shaft holes therein, and an ejector mechanism. The ejector mechanism consists of a push rod, an actuator having first and second pivots formed thereon, an ejection plate, and a spring. When a card is inserted into the card connector, the card abuts against ejecting pads of the ejection plate, the first pivot abuts against a first edge of the first shaft hole and the second pivot abuts against a first edge of the second shaft hole. To eject the card, a force is exerted on an exerting projection of the push rod. The actuator pivots about the first pivot, the second pivot abuts against a second edge of the second shaft hole, and the ejecting pads of the ejection plate push the card outward. This action constitutes the first ejection stage which disengages the card from contacts of the card connector. As the exerting projection of the push bar is pushed further, the actuator pivots about the second pivot and the first pivot abuts against a second edge of the first shaft hole. This action constitutes the second ejection stage which pushes the card out of the card connector.

These and additional objectives, features, and advantages of the present invention will become apparent after reading the following detailed description of the preferred embodiments of the invention taken in conjunction with the appended drawing figures.

DETAILED DESCRIPTION OF THE PREFERRED EMBODIMENT

Reference will now be made in detail to the preferred embodiment of the present invention.

Figure 1:
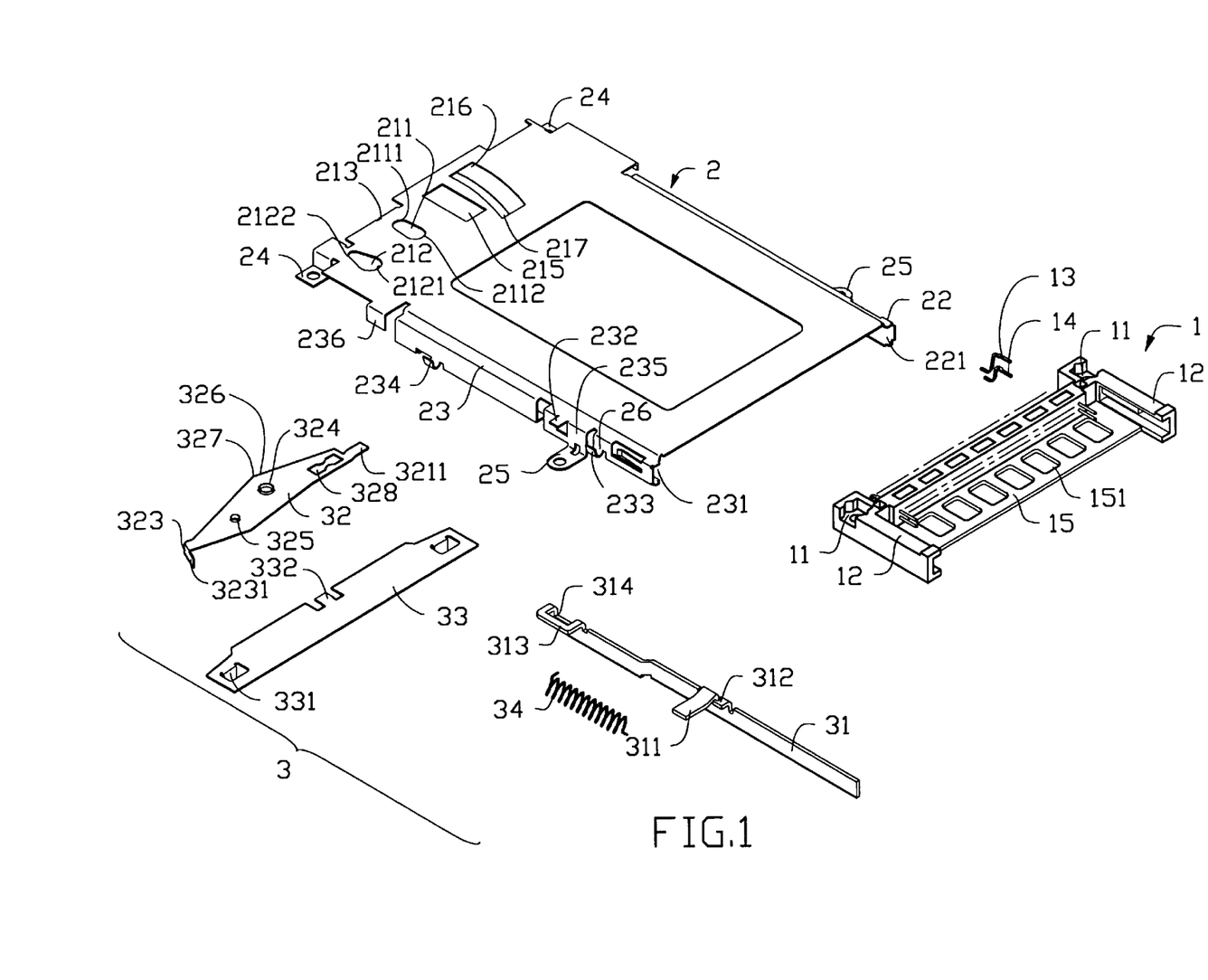
FIG. 1 is an exploded view of a card connector in accordance with a first embodiment of the present invention.

Referring to FIG. 1, a card connector in accordance with the present invention includes a dielectric terminal housing 1, a metal card housing 2, and an ejector mechanism 3.

The elongate terminal housing 1 is formed with two guiding arms 12 at lateral ends thereof, a fixing plate 15 defining a number of openings 151 therethrough disposed between the guiding arms 12, and a recess 11 for receiving a bolt (not shown) defined in each guiding arm 12 for fastening the terminal housing 1 to a printed circuit board (not shown). A plurality of first and second contacts 13, 14 are fixedly received in the terminal housing 1.

The rectangular card housing 2 is formed by a metal stamping procedure to have two U-shaped elongate side portions 22, 23 extending downward from opposite sides thereof, two pairs of attaching portions 24, 25 each extending from opposite lateral sides of the card housing 2 for attachment to the PCB, and a pair of guiding hooks 233, 234 and a pair of flanges 235, 236 extending from the side portion 23 and defining a guiding passage 26 defined therebetween. A first engaging projection 232 extends from the side portion 23 adjacent to the flange 235. Guiding grooves 221, 231 are defined along inner faces of the side portions 22, 23 for guiding an electrical card 4 (FIG. 4A) therethrough. A first shaft hole 211, a second shaft hole 212, a rectangular window 215, and a biasing portion 216 with a groove 217 are all defined through a rear portion of the card housing 2. A retaining portion 213 downwardly extends from a rear edge of the card housing 2.

The ejector mechanism 3 comprises an elongate push rod 31, an actuator 32, a rectangular ejection plate 33, and a spring 34. The push rod 31 forms an exerting projection 311 laterally extending from a middle portion thereof for receiving an external force from a user, a second engaging projection 312 adjacent to the exerting projection 311, and an L-shaped connecting member 313 at an end thereof defining an opening 314 therethrough. The actuator 32 forms a tongue 3211 at one end thereof, a connecting portion 323 downwardly extending from another end thereof with a connecting tab 3231 forwardly extending therefrom, first and second pivots 324, 325 projecting from a top surface thereof, an engaging aperture 328 near the tongue 3211, and a rear edge 326 with a fulcrum point 327 formed in a middle portion thereof. The ejection plate 33 forms a pair of ejecting pads 331 downwardly extending from lateral ends thereof and an engaging tab 332 projecting from a rear edge thereof.

Figure 2A:
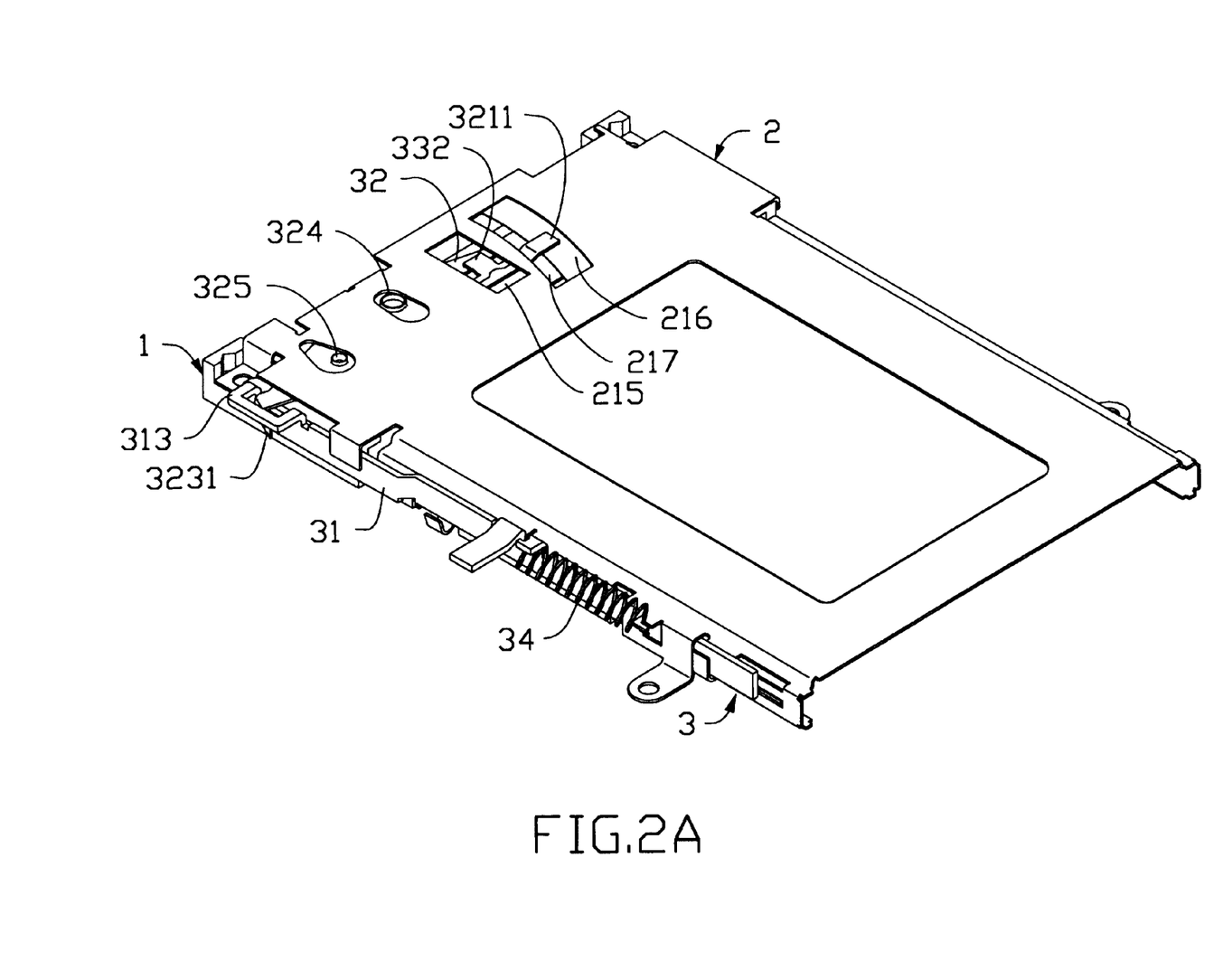
FIG. 2A is an assembled view of FIG. 1.
Figure 2B:
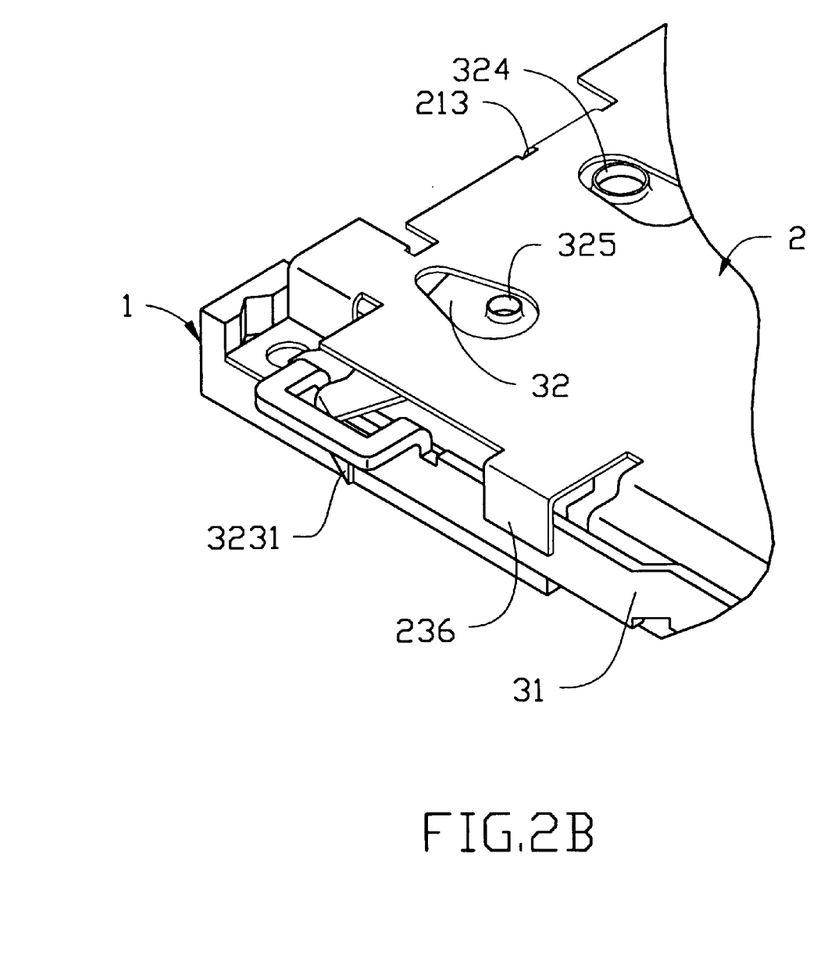
FIG. 2B is a partial, enlarged view of FIG. 2A.
Figure 3:
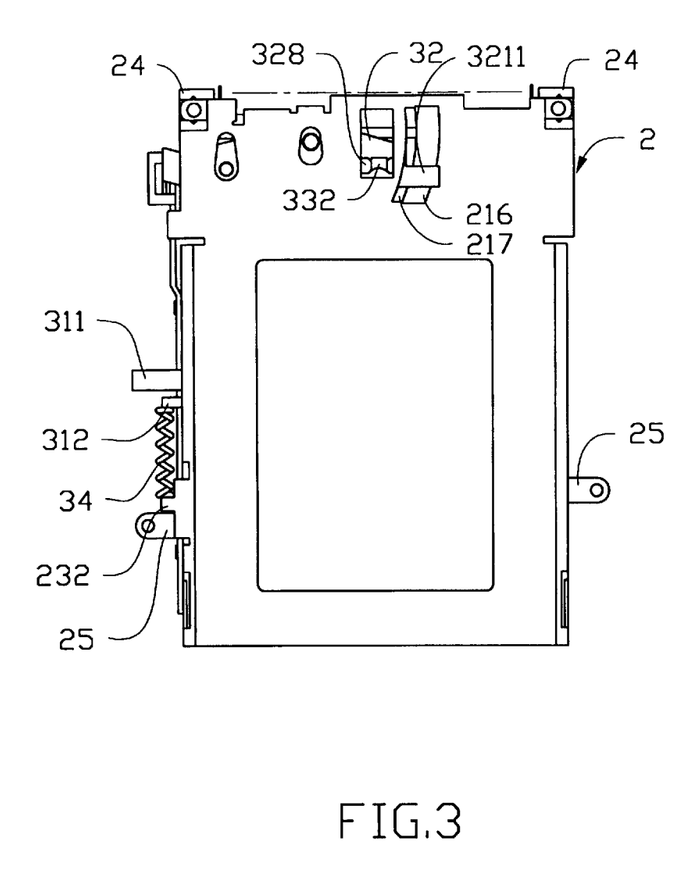
FIG. 3 is a top view of FIG. 2A.

In assembly as shown in FIGS. 2A, 2B, and 3, the engaging tab 332 of the ejection plate 33 extends through the engaging aperture 328 of the actuator 32 from a bottom surface thereof. The actuator 32 together with the ejection plate 33 is then attached to the card housing 2 whereby the first and second pivots 324, 325 of the actuator 32 are received in the first and second shaft holes 211, 212 of the card housing 2, respectively. The tongue 3211 of the actuator 32 extends through the groove 217 and rests on the biasing portion 216 of the card housing 2. The window 215 of the card housing 2 provides the engaging tab 332 with clearance whereby movement thereof is unhindered. The push rod 31 is received in the guiding passage 26 of the card housing 2 and the connecting tab 3231 extends through the opening 314 of the push rod 31. The spring 34 is disposed between the first engaging projection 232 of the card housing 2 and the second engaging projection 312 of the push rod 31. The attaching portions 24 of the card housing 2 are received in the corresponding recesses 11 of the terminal housing 1. The assembled card connector is then positioned on a PCB and the bolts are inserted through the attaching portions 24, 25 of the card housing 2 to mount the card connector thereon.

Figure 4A:
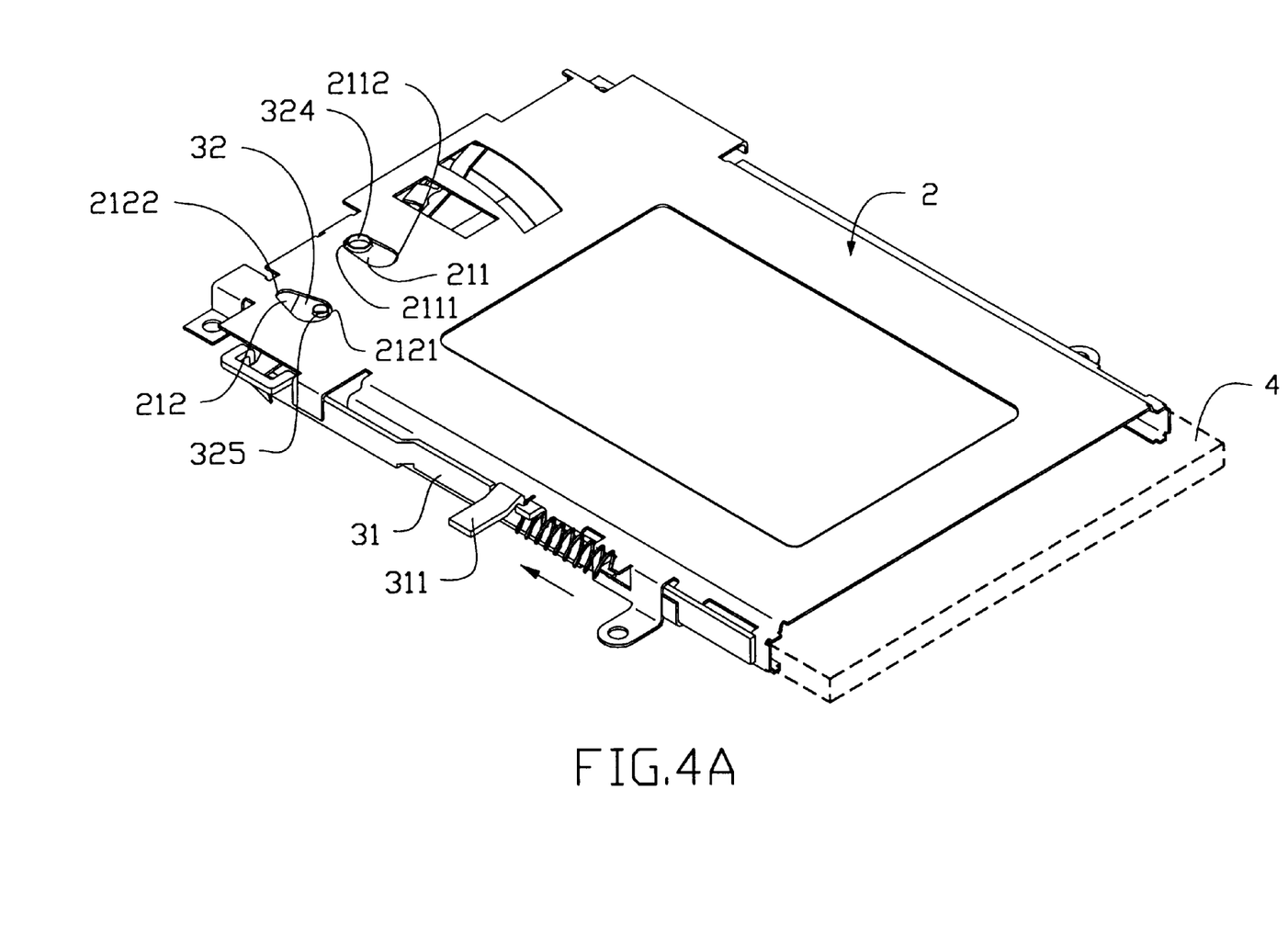
FIG. 4a is an assembled view of a card connector in accordance with the first embodiment of the present invention with a card (shown in dotted lines) inserted therein and a terminal housing removed therefrom.
Figure 4B:
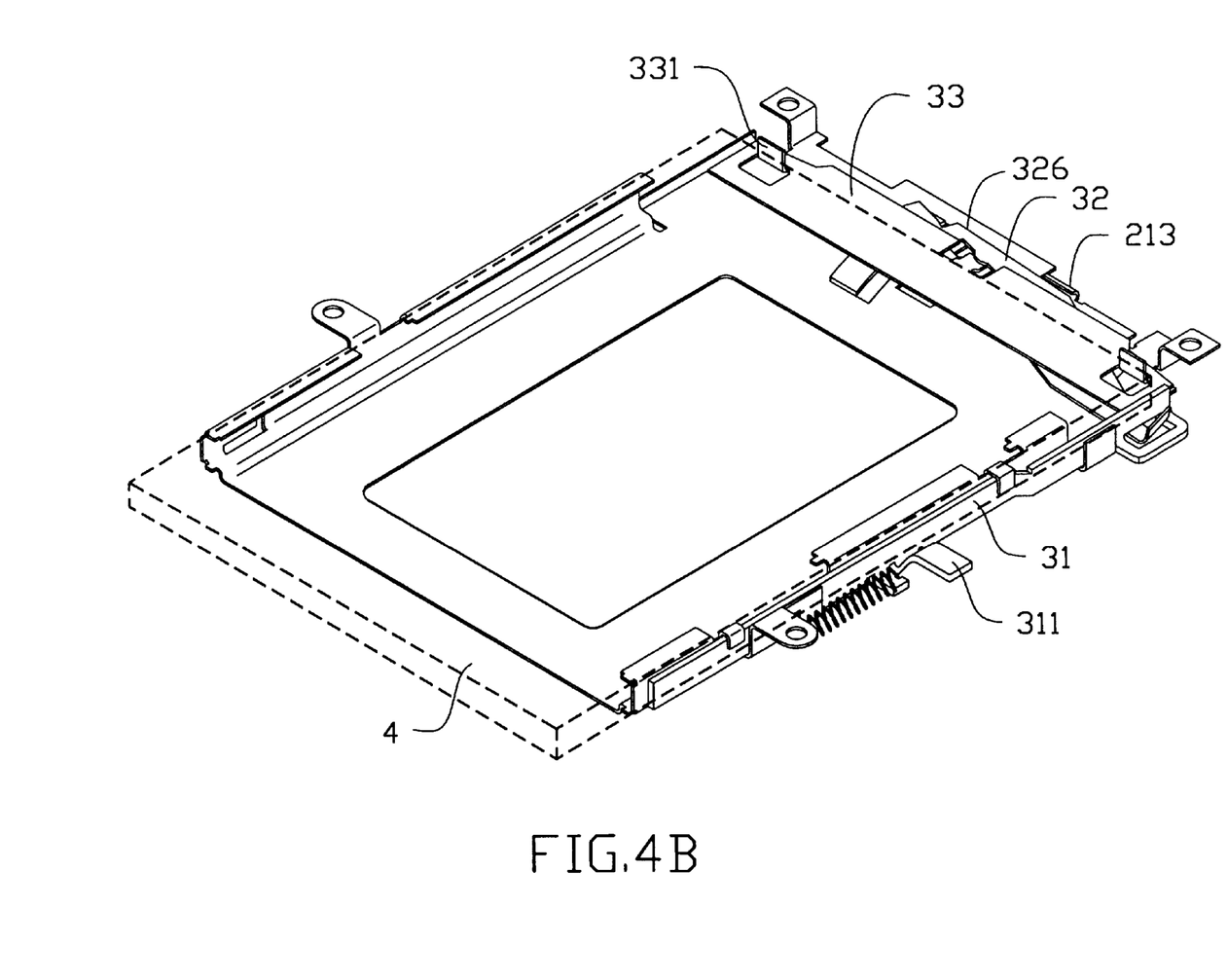
FIG. 4B is a bottom view of FIG. 4A.
Figure 5A:
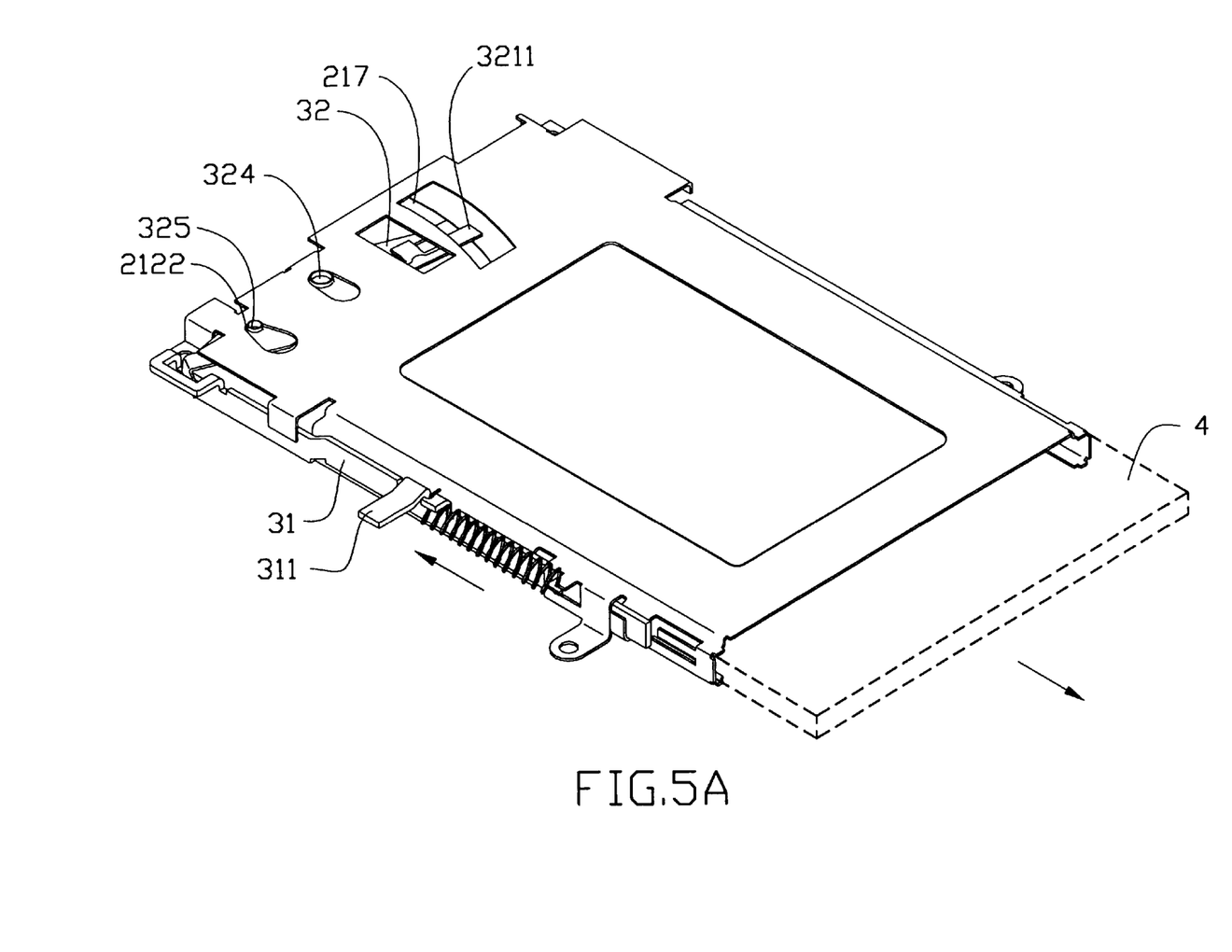
FIG. 5A shows the card connector of FIG. 4A during a first ejection stage.
Figure 5B:
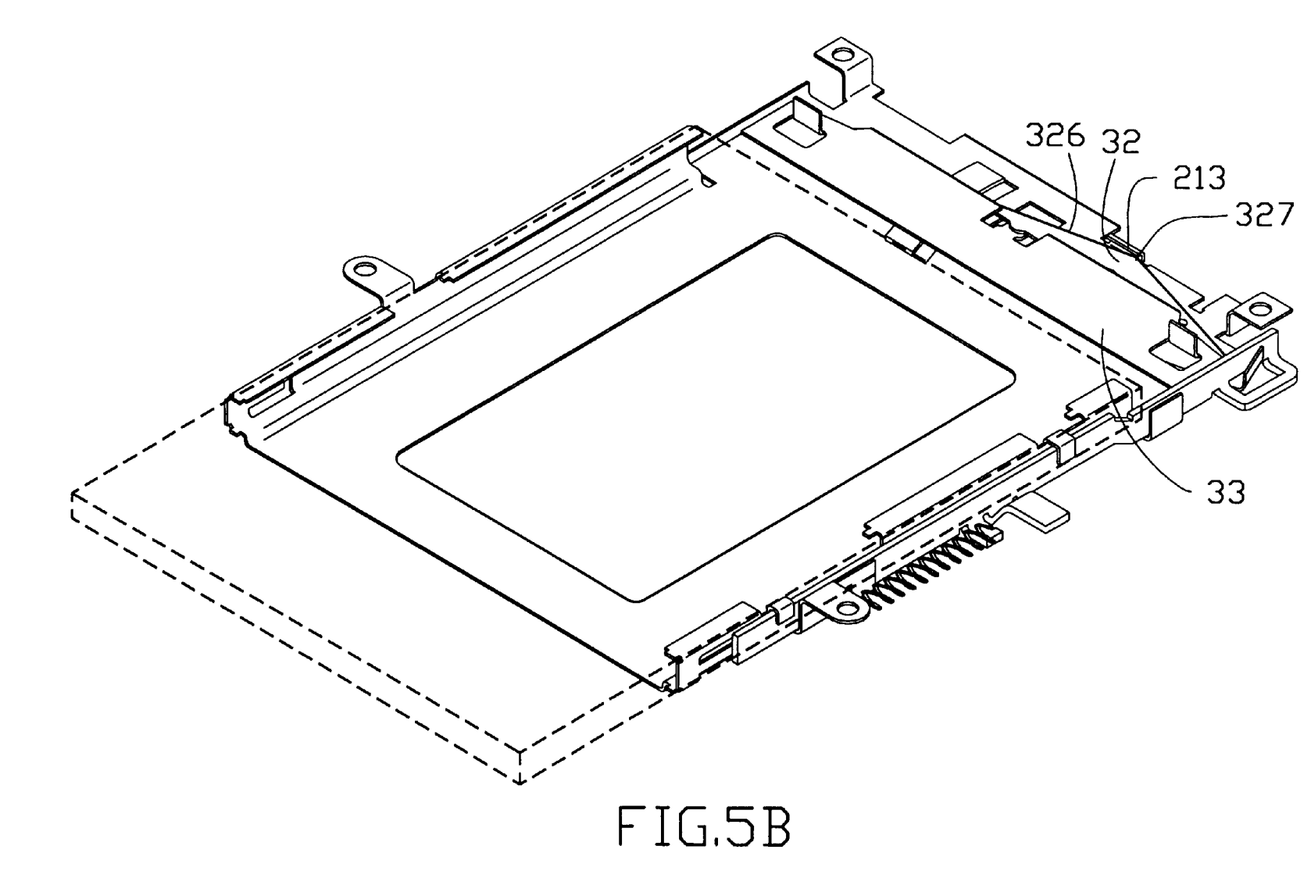
FIG. 5B is a bottom view of FIG. 5A.
Figure 6A:
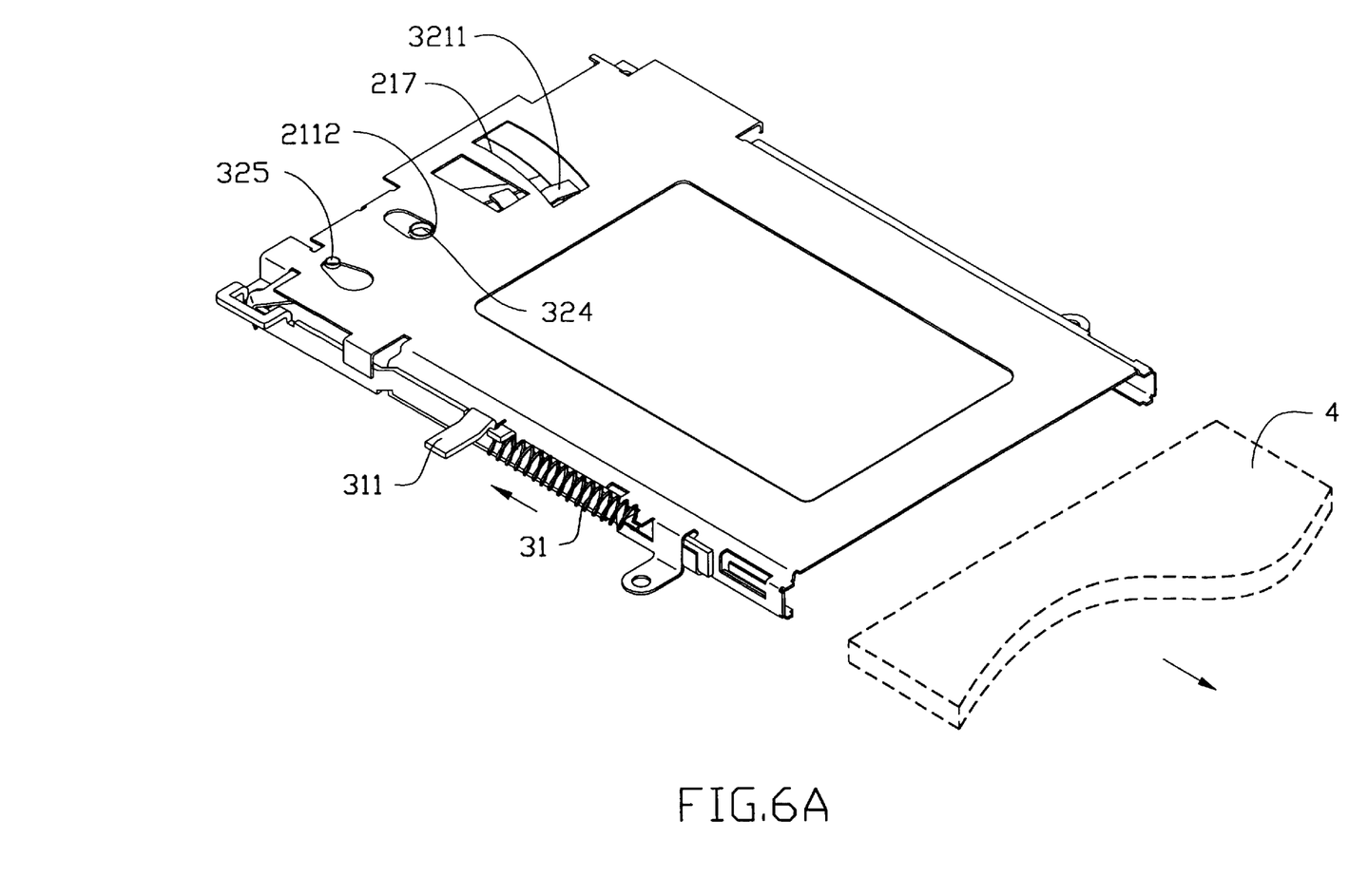
FIG. 6A shows the card connector of FIG. 4A during a second ejection stage.
Figure 6B:
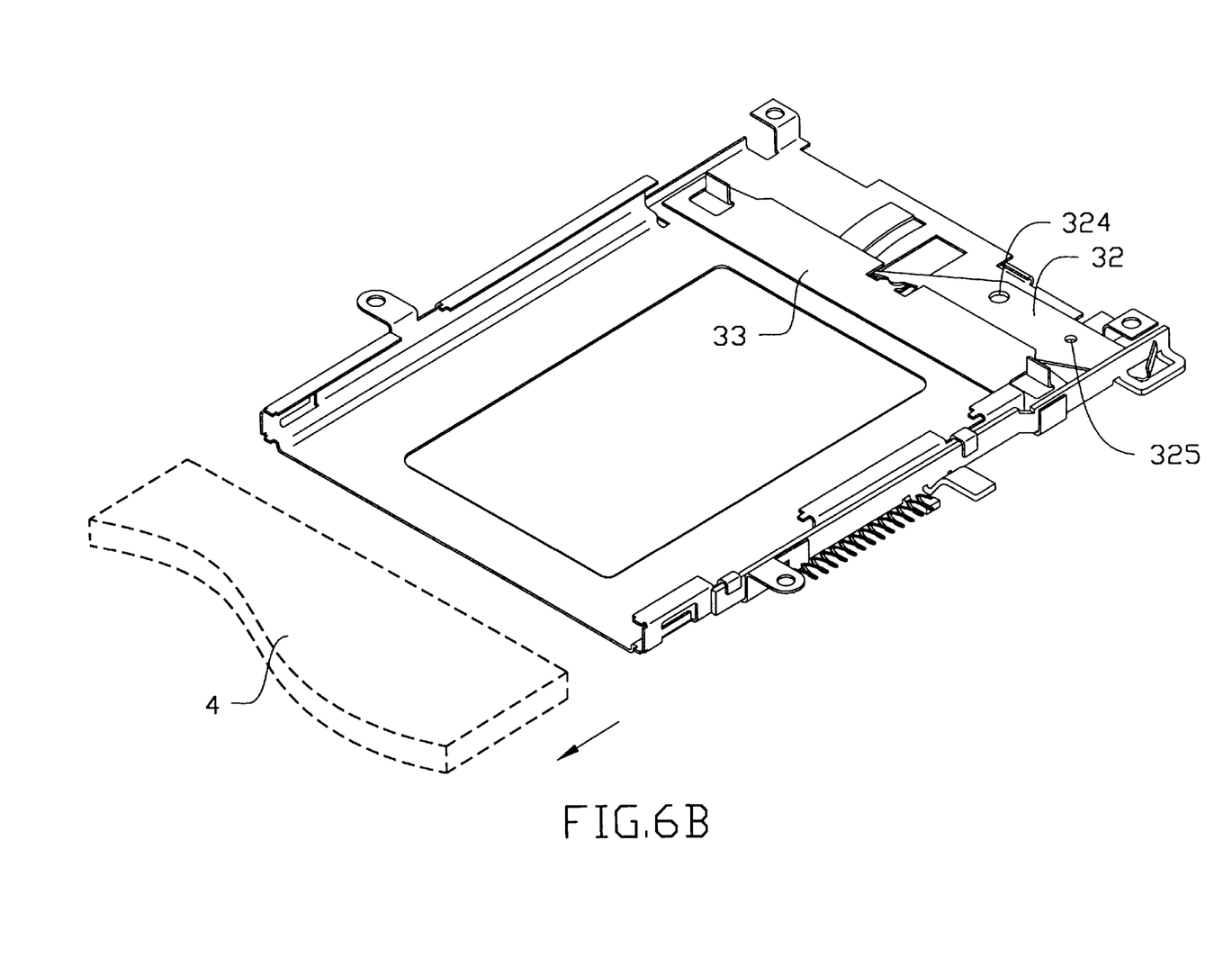
FIG. 6B is a bottom view of FIG. 6A.

When the card 4 is inserted into the card connector as shown in FIGS. 4a and 4B, the card 4 abuts against the ejecting pads 331 of the ejection plate 33, the first pivot 324 abuts against a first edge 2111 of the first shaft hole 211, the second pivot 325 abuts against a first edge 2121 of the second shaft hole 212, and the rear edge 326 of the actuator 32 abuts against the retaining portion 213 of the card housing 2. To eject the card 4, a force is exerted on the exerting projection 311 of the push rod 31 in the direction indicated by the arrow in FIG. 5A. The actuator 32 pivots about the first pivot 324, the second pivot 325 abuts against a second edge 2122 of the second shaft hole 212, the fulcrum point 327 abuts against the retaining portion 213, and the tongue 3211 of the actuator 32 moves along the groove 217 which causes the ejecting pads 331 of the ejection plate 33 to push the card 4 outward, as shown in FIG. 5B. This action constitutes the first ejection stage which disengages the card 4 from the contacts 13, 14 of the card connector. As the exerting projection 311 of the push rod 31 is pushed further, the actuator 32 pivots about the second pivot 325, the first pivot 324 abuts against a second edge 2112 of the first shaft hole 211, and the tongue 3211 of the actuator 32 moves to an end of the groove 217. This action constitutes the second ejection stage which pushes the card 4 out of the card connector, as shown in FIGS. 6A and 6B. It is noted that the transition from the first ejection stage to the second ejection stage is smooth whereby the card 4 can be easily and effectively ejected from the card connector.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

What is claimed is:

1. An electrical connector for engaging an inserted electrical card comprising:

a dielectric terminal housing having a plurality of contacts fixedly received therein;

a metal card housing attached to the terminal housing, having two U-shaped elongate side portions extending downward from opposite sides thereof for guiding the electrical card toward the contacts, forming a guiding passage along one of the side portions, and defining a first shaft hole and a second shaft hole in a rear portion thereof; and an ejector mechanism comprising:
an elongate push rod received in the guiding passage of the card housing and forming a connecting member at an end thereof defining an opening therethrough;
an actuator forming a connecting tab forwardly extending from an end thereof and extending through the opening of the push rod, a first pivot and a second pivot projecting from a top surface thereof and respectively received in the first and second shaft holes of the card housing, and an engaging aperture at another end thereof;
a rectangular ejection plate forming a pair of ejecting pads downwardly extending from lateral ends thereof, and an engaging tab projecting from a rear edge thereof and extending into the engaging aperture of the actuator;

whereby an electrical card can be easily and effectively ejected from the electrical connector in two stages, the first ejection stage disengaging the electrical card from the contacts and the second ejection stage pushing the electrical card out of the card housing.

2. The electrical connector as described in claim 1, wherein a pair of guiding hooks and a pair of flanges outwardly extend from one of the side portions and collectively from the guiding groove.

3. The electrical connector as described in claim 1, wherein an exerting projection laterally extends from a middle portion of the push rod for receiving an external force from a user.

4. The electrical connector as described in claim 3, wherein the ejector mechanism further includes a spring disposed between a first engaging projection extending from the side portion forming the guiding groove and a second engaging projection adjacent to the exerting projection of the push rod.

5. The electrical connector as described in claim 1, wherein a biasing portion with a groove are defined through a rear portion of the card housing, and a retaining portion downwardly extends from a rear edge of the card housing.

6. The electrical connector as described in claim 5, wherein a tongue is formed at one end of the actuator and extends through the groove to rest on the biasing portion of the card housing.

7. The electrical connector as described in claim 5, wherein a rear edge of the actuator forms a fulcrum point on a middle portion thereof, the fulcrum point abutting against the retaining portion during ejection of an electrical card from the electrical connector.

8. The electrical connector as described in claim 1, wherein a window is formed in the card housing for providing the engaging tab with clearance whereby movement thereof is unhindered.

9. An ejector mechanism for ejecting an electrical card from an electrical connector having a card housing defining first and second shaft holes therein and a terminal housing having contacts received therein, comprising:

an elongate push rod forming a connecting member at an end thereof defining an opening therethrough;

an actuator forming a connecting tab forwardly extending from an end thereof and extending through the opening of the push rod, a first pivot and a second pivot projecting from a top surface thereof and respectively received in the first and second shaft holes of the card housing, and an engaging aperture at another end thereof; and a rectangular ejection plate forming a pair of ejecting pads downwardly extending from lateral ends thereof, and an engaging tab projecting from a rear edge thereof and extending into the engaging aperture of the actuator;

whereby an electrical card can be easily and effectively ejected from the electrical connector in two stages, the first ejection stage disengaging the electrical card from the contacts and the second ejection stage pushing the electrical card out of the card housing.

10. The ejector mechanism as described in claim 9, wherein an exerting projection laterally extends from a middle portion of the push rod for receiving an external force from a user.

11. The ejector mechanism as described in claim 10 further including a spring disposed between a first engaging projection extending from the card housing and a second engaging projection adjacent to the exerting projection of the push rod.

12. The ejector mechanism as described in claim 9, wherein a tongue is formed at one end of the actuator and extends through a groove defined in the card housing.

13. The ejector mechanism as described in claim 9, wherein a rear edge of the actuator forms a fulcrum point on a middle portion thereof, the fulcrum point abutting against a retaining portion of the card housing during ejection of an electrical card from the electrical connector.

14. An arrangement for ejecting or inserting an electrical card from or into an electrical connector having a card housing defining first and second shaft holes therein and a terminal housing having contacts received therein; comprising:

a push rod;

an actuator pivotally connected to said push rod at one end thereof and including a first pivot and a second pivot respectively received within said first and said second shaft holes of the card housing, said second pivot being closer to the push rod than said first pivot;

an ejection plate pivotally connected to the other end of said first actuator; wherein when the electrical card is inserted into the electrical connector, the first pivot abuts against a rear edge of the first shaft hole and the second pivot abuts against a front edge of the second shaft hole; when the electrical card is ejected from the electrical connector, the actuator pivots about first the first pivot and then the second pivot until the second pivot abuts against a rear edge of the second shaft hole and the first pivot abuts against a front edge of the first shaft hole.

* * * * *